United States Patent [19]

Hoheisel et al.

[11] 4,170,939
[45] Oct. 16, 1979

[54] IGNITION DEVICE FOR A PASSIVE RETENTION SYSTEM

[75] Inventors: Peter-Matthias Hoheisel, Esslingen; Gerhard Komander, Altbach, both of Fed. Rep. of Germany

[73] Assignee: Daimler-Benz AG, Fed. Rep. of Germany

[21] Appl. No.: 817,030

[22] Filed: Jul. 19, 1977

[30] Foreign Application Priority Data

Jul. 27, 1976 [DE] Fed. Rep. of Germany ....... 2633590

[51] Int. Cl.$^2$ .......................... H01R 31/08; F42B 3/18
[52] U.S. Cl. .................................. 102/28 S; 200/51.1; 339/19
[58] Field of Search .......................... 102/28 R, 28 S; 200/51.1; 339/19

[56] References Cited

U.S. PATENT DOCUMENTS

| 3,370,140 | 2/1968 | Betts | 200/51.1 |
| 3,695,179 | 10/1972 | Rainone et al. | 102/28 R |

FOREIGN PATENT DOCUMENTS 807299 2/1969 Canada ....................................... 339/19

Primary Examiner—Verlin R. Pendegrass
Attorney, Agent, or Firm—Craig and Antonelli

[57] ABSTRACT

An ignition device for a passive retention system, especially in motor vehicles, in which an ignition unit arranged in a housing includes two plug pins which freely project on one side with their free end out of a casing and which are intended for slidingly receiving thereon a plug coupling, while the two plug pins are connected at the other end with an incandescent bridge and are surrounded by an ignition or primer mixture disposed inside of a casing; protective contact means are provided which protect the plug pins against electrostatic charges by short-circuiting the same prior to the emplacement of the plug coupling on the plug pins; the protective contact means consist of an essentially U-shaped elastic clamp which electrically conductively connects with each other the plug pins, when the plug coupling is not inserted, and which is automatically opened, when the plug coupling is inserted, in such a manner that the clamp interrupts the contact between the plug pins only when the regular ignition circuit has already been established.

15 Claims, 2 Drawing Figures

FIG 1
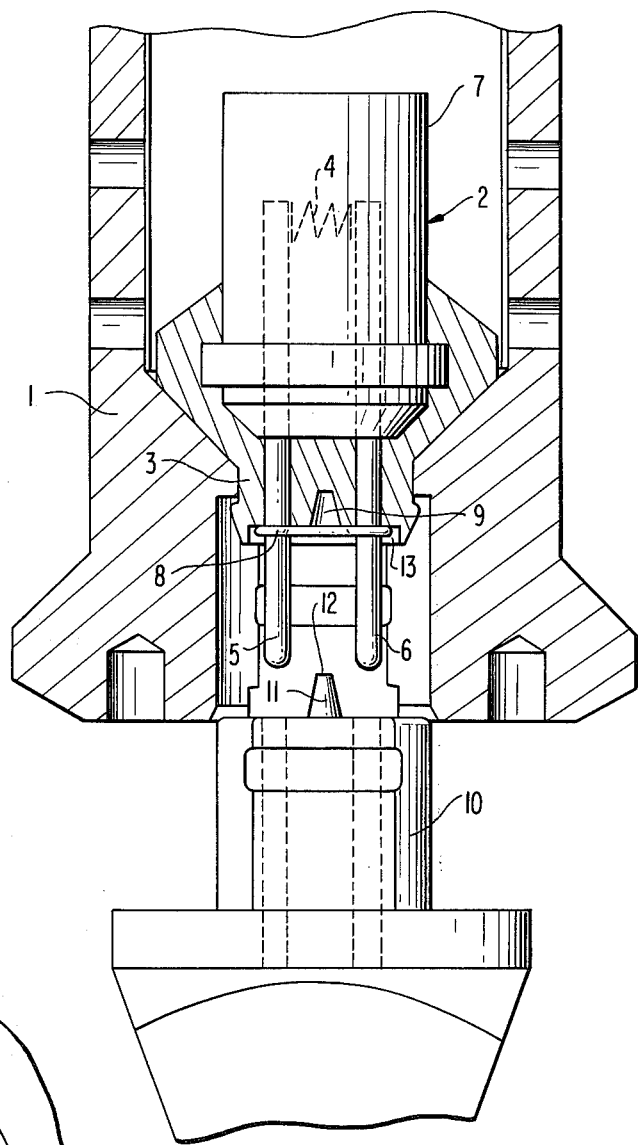
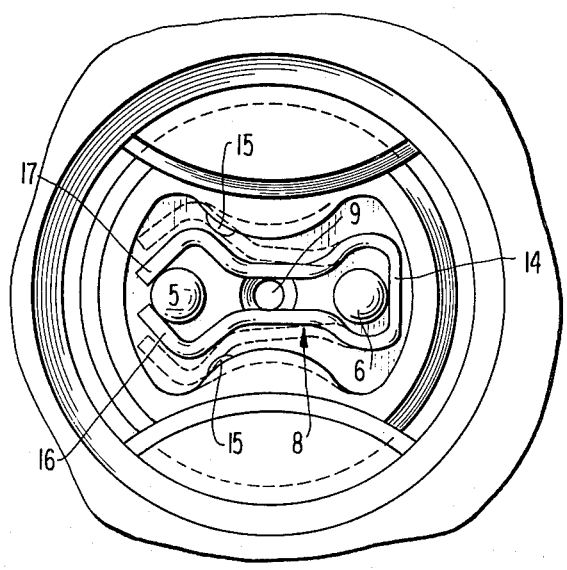
FIG 2

IGNITION DEVICE FOR A PASSIVE RETENTION SYSTEM

The present invention relates to an ignition device for a passive retention system, especially in motor vehicles, in which an ignition unit arranged in a housing includes two plug pins which freely project on one side with their free ends out of a casing or base for the purpose of slidingly receiving a plug-coupling, and which are connected on the other side with an incandescent bridge and are surrounded by a primer or ignition mixture disposed within a casing, and in which furthermore protective contact means are provided which protect the plug-pins against electrostatic charges by short-circuiting prior to the emplacement of the plug-coupling, as disclosed in the German Patent Application No. P 24 60 427. 1-16 and U.S. Pat. No. 4,110,813.

In the ignition installation according to the aforementioned German patent application, the plug pins are protected prior to putting the device into operation, by a cover-like blind-coupling which is provided with a protective contact-strip for short-circuiting the plug-pins.

During the installation, the protective contact-strip is removed and therewith also the safety against an undesired electrical ignition of the ignition unit. Also with an eventual disengagement of the plug-coupling, for example, during disassembly of the installation, the plug pins are not short-circuited always immediately after the disengagement of the plug-coupling by means of a new protective contact strip so that the danger of an autoignition exists.

It is the aim of the present invention to so construct the ignition installation that the plug pins are always short-circuited in the uncoupled condition of the device without additional measures and in that the short-circuiting of the plug pins is eliminated only when connecting the plug-coupling with the pins.

The underlying problems are solved according to the present invention in that the protective contact means consist of an essentially U-shaped springy clamp which electrically conductively connects the plug pins with each other when the plug-coupling is not slipped over the same, and which is automatically opened during the insertion of the plug-coupling in such a manner that the clamp interrupts the contact between the plug pins only, when the regular ignition circuit is already closed. As a result of the permanent presence of the clamp within the area of the plug pins and as a result of the automation of the short-circuiting or of the contact release, the highest safety against an undesired ignition of the device is achieved.

A centrally projecting conical expanding-pin may be arranged in an advantageous manner at the plug-coupling or socket, which expands the clamp when sliding the plug-coupling onto the plug pins so that the clamp loses the contact with one of the plug pins.

It is achieved thereby that the short-circuit connection of the plug pins is interrupted only immediately prior to pressing-in the plug coupling into the plug by expanding the clamp, after the regular ignition circuit has already been closed. Similarly, the contact is again established as soon as the plug-coupling is pulled out of the plug and the conical extension thereof no longer acts on the clamp. An interruption of the short-circuited plug pins is possible in practice only with the aid of a plug coupling so that a misuse of the ignition device is at least rendered difficult.

Furthermore, the clamp may be arranged in a recess provided in the base for the plug pins and the base may be provided with a further recess corresponding to the conical extension at the plug-coupling.

Additionally, the recess in the base for the clamp may be provided with undercuts and/or projecting abutments which prevent the expanded clamp from being axially pulled off the plug pins.

Finally, the clamp may be so constructed that its free ends abutting at a plug pin exert both a pressure directed toward one another as also a pressure in the direction toward the other plug pin.

A stable equilibrium condition is achieved by this form of the clamp in conjunction with the spring force thereof, which forces the clamp into an abutment at the plug pins. In the spread-apart condition, the contour of the recess prevents a displacement or rotation of the clamp conditioned by vibrations or shock interaction, which could lead to an undesired short-circuiting of the plug pins.

Accordingly, it is an object of the present invention to provide an ignition device for a passive retention system which avoids by simple means the aforementioned shortcomings and drawbacks encountered in the prior art.

Another object of the present invention resides in an ignition device for a passive retention system, especially motor vehicles, which minimizes the danger of an undesired autoignition.

A further object of the present invention resides in an ignition device for passive retention systems which brings about a short-circuiting of the plug pins under all conditions when the plug is in the uncoupled condition.

Still a further object of the present invention resides in an ignition device for a passive retention system in which the short-circuiting of the plug pins is lifted only when mounting the plug-coupling over the pins.

Another object of the present invention resides in an ignition device for a passive retention system in which an undesired and unintentional ignition as a result of electrostatic charges is precluded with greatest certainty.

A further object of the present invention resides in an ignition device for a passive retention system in motor vehicles in which an interruption of the short-circuited plug pins is practically possible only with the aid of a plug-coupling of complementary design.

These and other objects, features and advantages of the present invention will become more apparent from the following description when taken in connection with the accompanying drawing which shows, for purposes of illustration only, one embodiment in accordance with the present invention, and wherein:

FIG. 1 is an axial cross-sectional view through a housing of an ignition device in accordance with the present invention with short-circuited plug pins and with a corresponding plug-coupling; and FIG. 2 is a somewhat schematic end elevational view on the plug pins of FIG. 1, on an enlarged scale.

Referring now to the drawing wherein like reference numerals are used throughout the two views to designate like parts, FIG. 1 illustrates an ignition unit generally designated by reference numeral 2 which is pressed into a housing 1 and which includes a base 3 of tenacious-elastic, temperature-resistant synthetic plastic material of any conventional type, in which the two plug pins 5 and 6 connected with an incandescent bridge 4 are embedded and in which they are surrounded by a conventional primer or igniting mixture within a preferably cylindrically constructed casing 7. The casing 7 serves for insulation and guidance of the ignition mixture as also for the effective protection of the incandescent bridge 4 against vibrational stresses and loads.

The two plug pins 5 and 6 are short-circuited by means of a U-shaped elastic clamp 8 in order to prevent an undesired ignition of the primer or ignition mixture by an electrostatic charge.

The base 3 is provided with a central recess 9 for a conical expanding pin 11 disposed at the plug-coupling 10, whose free end 12 having the smaller diameter is so dimensioned that it is able to engage between the two legs of the U-shaped clamp 8 and in the further course is able to expand the clamp with the larger diameter thereof in such a manner that the clamp releases or frees at least one of the plug pins 5 or 6.

The base 3 is provided additionally with a recess 13 for the accommodation of the clamp 8. The recess 13 is so shaped that the back 14 of the spread-apart or expanded clamp 8 cannot lift off from the surrounding plug pin 6, for example, by lateral displacement.

In order that the clamp 8 cannot itself be pulled off from the plug pins 5 and 6 when pulling off the plug-coupling 10, an undercut, retention nose or the like 15 is provided along each of the longitudinal sides of the recess 13. The ends 16 and 17 of the clamp 8 are so cranked off that in the non-spread-apart condition they surround the respective plug pin 5 and produce a force component which brings about a reliable abutment of the clamp back portion 14 at the other plug pin 6.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An ignition device for a passive retention system, comprising a housing means, an ignition unit including two plug pins arranged in the housing means, said plug pins having free ends projecting on one side out of a base means for purposes of slidingly receiving a plug-coupling means and being operatively connected on the other side with an incandescent bridge and surrounded thereat by an ignition mixture within a casing means, and protective contact means which protect the plug pins against electrostatic charges by short-circuiting the same prior to an emplacement of the plug-coupling means, characterized in that the protective contact means include a substantially U-shaped elastic clamp means for electrically conductively connecting the plug pins with each other with a non-inserted plug-coupling means, said elastic clamp means being adapted to be automatically opened during an insertion of the plug-coupling means in such a manner that the clamp means interrupts the contact between the plug pins only when the regular ignition circuit has already been closed, said elastic clamp means including two legs interconnected by a clamp back portion which abuts one of the two plug pins with a non-inserted plug-coupling means, each of the two legs terminates in a free end portion which abuts the other of the two plug pins with a non-inserted plug-coupling means, and in that at least one of the free end portions of the two legs is bent so as to surround said other of the two plug pins so as to produce a force component urging the clamp back portion into engagement with said one of the two plug pins with a non-inserted plug-coupling means.

2. A device according to claim 1, characterized in that the ignition device is for a passive retention system in motor vehicles.

3. A device according to claim 1, characterized in that a centrally projecting conical expanding pin is arranged at the plug-coupling means, said centrally projecting conical expanding pin being adapted to expand the clamping means during an insertion of the plug-coupling means so that the clamping means loses the contact with one of the plug pins.

4. A device according to claim 3, characterized in that a recess is provided in the base means for accommodating the clamp means, and an aperture is provided in the base means for accommodating the conical projection at the plug coupling means.

5. A device according to claim 4, characterized in that means are provided in said recess for preventing the clamp means from being axially pulled off the plug pins.

6. A device according to claim 5, characterized in that said preventing means includes undercuts.

7. A device according to claim 5, characterized in that said preventing means includes projecting abutments.

8. A device according to claim 5, characterized in that both free end portions are bent so as to exert a force directed toward one another.

9. A device according to claim 8, characterized in that the bent free end portions of the two legs of the clamp means each include a first inclined portion directed away from one another which are adjoined by a second portion directed toward one another which abut said other of the two plug pins with a non-inserted plug-coupling means.

10. A device according to claim 3, characterized in that a recess is provided in the base means for accommodating the clamp means.

11. A device according to claim 10, characterized in that means are provided in said recess for preventing the clamp means from being axially pulled off the plug pins.

12. A device according to claim 11, characterized in that said preventing means includes undercuts.

13. A device according to claim 11, characterized in that said preventing means includes projecting abutments.

14. A device according to claim 1, characterized in that both free end portions are bent so as to exert a force directed toward one another.

15. A device according to claim 14, characterized in that the bent free end portions of the two legs of the clamp means each include a first inclined portion directed away from one another which are adjoined by a second portion directed toward one another which abut said other of the two plug pins with a non-inserted plug-coupling means.

* * * * *